Patented Jan. 27, 1948

2,435,002

UNITED STATES PATENT OFFICE 2,435,002

PROCESS FOR THE MANUFACTURE OF PARA - AMINOBENZENE-SULPHONAMIDO-PYRIMIDINES

Max Hartmann, Riehen, and Harald von Meyenburg, Basel, Switzerland, assignors to Ciba Pharmaceutical Products, Incorporated, Summit, N. J., a corporation of New Jersey No Drawing. Application November 6, 1942, Serial No. 464,802. In Switzerland January 30, 1942

12 Claims. (Cl. 260—239.6)

Para - aminobenzene - sulphonamide-pyrimidines have already been prepared by reacting aminopyrimidines with suitably substituted benzene sulphonic acid derivatives.

It has now been found that para-aminobenzene-sulphonamido-pyrimidines can also be obtained by reacting benzene-sulphonyl-guanidines, which contain an amino group or a substituent capable of being converted into an amino group in the para position in the nucleus, with compounds possessing the grouping

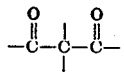

their tautomers or derivatives, respectively, replacing if desired substituents in the pyrimidine radical which can be replaced by hydrogen with hydrogen and, if desired, converting a substituent which may be converted into an amino group into such a group.

As parent materials, use may be made of benzene-sulphonyl-guanidines which contain in the para position an amino group or, for example, an acylamino, nitro, azo, halogen, or carboxyl group or its derivatives. The compounds can be easily obtained, for example, by the condensation of S-substituted pseudo-thiourea hydrohalides with the corresponding p-substituted benzene sulphonic acid halides and subsequent reaction with ammonia.

Compounds which possess the grouping

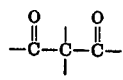

and which are suitable for the present process are, for example, 1:3-dialdehydes, 1:3-ketoaldehydes, 1:3-diketones, 1:3-aldehydo-, 1:3-ketocarboxylic acids, and 1:3-dicarboxylic acids or their tautomers, such as the hydroxymethylenealdehydes, -ketones and -carboxylic acids, or their derivatives, such as their alkali salts, acetals, mercaptals, imino compounds, ethers, or corresponding thioethers or esters. Thus, use may be made, for example, of 3-hydroxy-acroleine, formyl-acetone, formyl-diethyl-ketone, diethyl-acetyl-acetaldehyde, isocapronyl-acetaldehyde, acetylacetone, propionylacetone, iminoacetylacetone, formylacetic acid, acetoacetic acid ester, acetoneoxalic acid ester, malonic acid ester, or malonyl chloride, as well as of cyclic compounds, such as hydroxy-methylene cyclohexanone, or their derivatives, respectively, and the like.

The reaction can take place in the presence or absence of solvents, for example, by merely heating the components. It may also be carried out in the presence of condensing agents, such as alkali alcoholates, mineral acids and the like.

Should the products of the present process contain substituents in the pyrimidine radical, such as the hydroxy or carboxyl group or a halogen atom, which can be replaced by hydrogen, these may be exchanged for hydrogen by the usual methods.

Substituents capable of being converted into amino groups may be converted into such groups by the usual methods of working, for instance, acylamino compounds may be saponified, nitro or azo compounds may be reduced, halogen compounds may be reacted with ammonia, and carboxylic acids may be converted by the methods of Hofmann or Curtius by way of the amides or hydrazides.

The products of the present process may be used for therapeutic purposes or as intermediate products in the manufacture of therapeutically active substances.

Example 1

25.6 parts of para-acetylaminobenzene sulphonylguanidine (M. P. 289° C., prepared from guanidine nitrate and para-acetylamino-benzene sulphonic acid chloride in acetone with addition of caustic soda) are heated with 10 parts of acetylacetone, 80 parts of alcohol and 40 parts of water for 2-3 days in an autoclave at 100–110° C. A clear solution is formed which is evaporated to the thickness of syrup. This is then dissolved in dilute caustic soda solution, small quantities of undissolved matter being filtered off after one hour. By neutralizing with acid a precipitate is obtained which is then boiled with hydrochloric acid for a short time. The solution obtained is decolourized with animal charcoal and filtered. By neutralization with caustic soda, crystals of 2-(p - amino - benzene - sulphonamido)-4:6-dimethylpyrimidine are precipitated; these may be purified by recrystallizing from absolute alcohol. M. P. 175–177° C.

Example 2

25.6 parts of para-acetylaminobenzene sulphonylguanidine (M. P. 289° C., prepared from guanidine nitrate and para-acetylamino-benzene sulphonic acid chloride in acetone with addition of caustic soda) are heated with 11 parts of sodium hydroxymethylene-acetone, 80 parts of alcohol, and 40 parts of water for 40-50 hours in an autoclave at 150–160° C. A solution is formed which is freed from traces of impurities by filtering while still hot; it is then evaporated to dryness on the waterbath. The residue is dissolved in caustic soda; the solution is freed from insoluble impurities and neutralized with acid. The precipitate which is thus formed is boiled for some time with dilute caustic soda. Neutralization of the solution thus obtained with hydrochloric acid causes precipitation of 2-(p-aminobenzene - sulphonamido)-4-methyl - pyrimidine, M. P. 235° C.

2 - (para - aminobenzenesulphonamido) - pyrimidine of melting point 254–256° C. can be obtained in similar manner when using sodium-3-hydroxyacroleine or 3-ethoxy-acroleine-diethyl-acetal instead of sodium hydroxymethylene-acetone.

Example 3

12.8 parts of para-acetylaminobenzene sulphonylguanidine (M. P. 289° C., prepared from guanidine nitrate and para-acetylamino-benzene sulphonic acid chloride in acetone with addition of caustic soda) are suspended in a solution of 4 parts of sodium in 100 parts of absolute alcohol. To this suspension, 8.7 parts of β-ethoxy-acroleine-diethyl-acetal are added, and the reaction mixture is heated for several hours under a reflux condenser. After cooling, 400 parts of water are added, the reaction mixture is filtered, and 2-(p - acetylaminobenzene - sulphonamido)-pyrimidine is precipitated from the filtrate by addition of hydrochloric acid. The product may be recrystallized from 50 per cent alcohol. M. P. 256° C.

Example 4

4 parts of sodium are dissolved in 100 parts of absolute alcohol, 8 parts of malonic acid diethyl ester are added and, whilst stirring, 12.8 parts of para-acetylamino-benzene sulphonylguanidine (M. P. 289° C., prepared from guanidine nitrate and para-acetylamino-benzene sulphonic acid chloride in acetone with addition of caustic soda) are introduced slowly into the still warm solution, which is then boiled under reflux for some hours. After cooling, the precipitate which forms is filtered off at the pump, washed with absolute alcohol and dissolved in water. On filtering and adding hydrochloric acid, 2-(p-acetylaminobenzene -sulphonamido) - 4:6 - dihydroxypyrimidine is precipitated, which may be recrystallized from water. The product decomposes at 200° C. with frothing.

Example 5

To a solution of 3.5 parts of sodium in 90 parts of absolute alcohol 5 parts of acetyl-acetone and 12.2 parts of p-nitrobenzene-sulphonyl-guanidine (prepared from guanidine nitrate and p-nitrobenzene sulphonic acid chloride in acetone with addition of concentrated caustic soda solution) are added. The mixture is boiled for several hours under reflux with stirring. After cooling, the precipitate is filtered at the pump, washed with a little absolute alcohol, and dissolved in water. By addition of hydrochloric acid to this solution, 2-(p-nitrobenzene-sulphonamido)-4:6-dimethylpyrimidine is obtained, which may be purified by recrystallizing from dilute alcohol. M. P. 208–210° C. By reduction of this product with iron and hydrochloric acid, 2-(p-aminobenzene-sulphonamido) - 4:6 - dimethyl - pyrimidine may be obtained; it may be recrystallized from 50 per cent alcohol and melts at 175–177° C.

What we claim is:

1. Process for the manufacture of a sulphonamido derivative of pyrimidine which comprises causing a compound of the formula

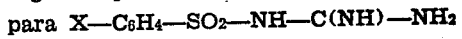
para X—C₆H₄—SO₂—NH—C(NH)—NH₂ wherein X represents a radical selected from the group consisting of free amino, radicals which are convertible to free amino by hydrolysis, and radicals which are convertible to free amino by reduction, to interact with a β-dicarbonyl compound which contains a grouping

—CO—CHR—CO— which is capable of enolising and in which R represents a member of the group consisting of hydrogen and hydrocarbon radicals, whereby to effect condensation of the two compounds with formation of a diazine ring.

2. Process as claimed in claim 1 wherein the condensation is carried out in presence of an inert organic liquid.

3. Process for the manufacture of a sulphonamido derivative of pyrimidine which comprises causing a compound of the formula

para—NH₂—C₆H₄—SO₂—NH—C(NH)—NH₂ to interact with an aliphatic beta-diketone, whereby to effect condensation of the two compounds with formation of a diazine ring.

4. Process for the manufacture of a sulphonamido derivative of pyrimidine which comprises causing a compound of the formula

para—NO₂—C₆H₄—SO₂—NH—C(NH)—NH₂ to interact with an aliphatic beta-diketone, whereby to effect condensation of the two compounds with formation of a diazine ring.

5. Process for the manufacture of a sulphonamido derivative of pyrimidine which comprises causing a compound of the formula

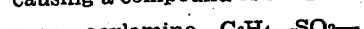
para—acylamino—C₆H₄—SO₂—
NH—C(NH)—NH₂ to interact with an aliphatic beta-diketone, whereby to effect condensation of the two compounds with formation of a diazine ring.

6. Process for the manufacture of a sulphonamido derivative of pyrimidine which comprises causing a compound of the formula

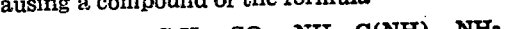
para—NH₂—C₆H₄—SO₂—NH—C(NH)—NH₂ to interact with acetyl-acetone, whereby to effect condensation of the two compounds with formation of a diazine ring.

7. Process for the manufacture of a sulphonamido derivative of pyrimidine which comprises causing a compound of the formula

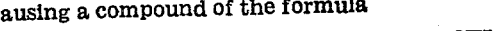
para—NO₂—C₆H₄—SO₂—NH—C(NH)—NH₂ to interact with acetyl-acetone, whereby to effect condensation of the two compounds with formation of a diazine ring.

8. Process for the manufacture of a sulphonamido derivative of pyrimidine which comprises causing a compound of the formula

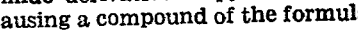
para—acylamino—C₆H₄—SO₂—
NH—C(NH)—NH₂ to interact with acetyl-acetone, whereby to effect condensation of the two compounds with formation of a diazine ring.

9. A process for the manufacture of p-aminobenzenesulphonamido-pyrimidine, which comprises the steps of heating p-acetylaminobenzenesulphonylguanidine with a β-oxyacroleine compound, and then hydrolyzing the acetyl group of the resultant product.

10. A process for the manufacture of p-aminobenzenesulphonamido-pyrimidine, which comprises the steps of heating p-acetylaminobenzenesulphonylguanidine with a hydroxymethyleneacetone compound, and then hydrolyzing the acetyl group of the resultant product.

11. A process for the manufacture of p-aminobenzenesulphonamido-pyrimidine, which comprises the steps of heating p-acetylaminobenzenesulphonylguanidine with acetylacetone, and then hydrolyzing the acetyl group of the resultant product.

12. Process for the manufacture of a sulphonamido derivative of pyrimidine, which comprises causing p-acetylaminobenzenesulphonylguanidine to interact with a β-dicarbonyl compound which contains the grouping —CO—CH$_2$—CO—, whereby to effect the condensation of the two compounds with formation of a diazine ring.

MAX HARTMANN.
HARALD von MEYENBURG.

REFERENCES CITED

The following references are of record in the file of this patent:

UNITED STATES PATENTS

| Number | Name | Date |
|---|---|---|
| 2,229,784 | Winnek | Jan. 28, 1941 |
| 2,233,569 | Winnek | Mar. 4, 1941 |
| 2,301,000 | Winnek | Nov. 3, 1942 |

FOREIGN PATENTS

| Number | Country | Date |
|---|---|---|
| 216,269 | Switzerland | Dec. 1, 1941 |
| 216,270 | Switzerland | Dec. 1, 1941 |

OTHER REFERENCES

Chemical Reviews, Aug. 1940, pages 103–108.

Journal American Chem. Soc., Aug. 1940, pages 2002–2005; ibid., Aug. 1941, pages 2188–2190; ibid., Nov. 1941, pages 3028–3030.